United States Patent [19]

Bauer

[11] 4,264,821
[45] Apr. 28, 1981

[54] CASSETTE FOR AN X-RAY FILM

[75] Inventor: Walter Bauer, Munich, Fed. Rep. of Germany

[73] Assignee: AGFA-Gevaert, A.G., Leverkusen, Fed. Rep. of Germany

[21] Appl. No.: 4,308

[22] Filed: Jan. 17, 1979

[30] Foreign Application Priority Data

Jan. 23, 1978 [DE] Fed. Rep. of Germany ....... 2802730

[51] Int. Cl.³ .............................................. G03B 41/18
[52] U.S. Cl. ..................................... 250/480; 250/481
[58] Field of Search ................................ 250/480, 481

[56] References Cited

U.S. PATENT DOCUMENTS

| 2,590,891 | 4/1952 | Reuter | 250/480 |
| 2,590,892 | 4/1952 | Reuter | 250/480 |
| 2,999,275 | 9/1961 | Blume, Jr. | 335/284 |
| 3,704,369 | 11/1972 | Paidosh | 250/481 |

Primary Examiner—Alfred E. Smith
Assistant Examiner—T. N. Grigsby
Attorney, Agent, or Firm—Michael J. Striker

[57] ABSTRACT

A cassette for an X-ray film has a cover part, a body part, and means for connecting these parts in a closed position of the cassette. A magnetic plate is associated with one of the parts, whereas a counterplate is associated with the other part of the cassette. The counterplate is constituted by a material which is highly susceptible to a magnetic moment so that in the closed position of the cassette, the counterplate is attracted to the magnetic plate, whereby the coils are urged toward one another and reinforcing parts which surround the X-ray film are pressed to the latter.

13 Claims, 2 Drawing Figures

CASSETTE FOR AN X-RAY FILM

BACKGROUND OF THE INVENTION

The present invention relates to a cassette for accommodating an X-ray film. More particularly, it relates to a cassette which has a body part, a cover part, and connecting means for connecting these parts with one another in a closed position of the cassette.

Cassettes of the above-mentioned general type are known in the art. In such a cassette elastic inserts which are constituted by a foam material are utilized for pressing reinforcing foils to an X-ray film. It is also known to attain this pressure by springs. It has been recognized, however, that in large-size cassettes the body part and the cover part are buckled as a result of a surface force of the elastic inserts. This is extremely undesirable since on the one hand the cassette does not lie flat, and on the other hand the pressure between the film and the reinforcing foils is variable and thereby the X-ray picture is not sharp.

In order to counteract this disadvantageous effect, attempts were made to form the cassettes with rigid walls. This, however, leads to an undesirably high X-ray absorption.

SUMMARY OF THE INVENTION

Accordingly, it is an object of the present invention to provide a cassette for accommodating an X-ray film, which avoids the disadvantages of the prior art.

More particularly, it is an object of the present invention to provide a cassette for accommodating an X-ray film, which retains a true cassette shape, has improved absorption characteristics, and provides for uniform pressure between reinforcing foils and an X-ray film located therebetween.

In keeping with these objects and with others which will become apparent hereinafter, one feature of the present invention resides, briefly stated, in a cassette which has a body part and a cover part, and is provided with a magnetic plate associated with one part of the cassette and a counterplate which is associated with another part of the cassette and constituted by a material which is highly susceptible to a magnetic moment. In such a construction, the counterplate is attracted to the magnetic plate with a uniform pulling force, whereby a uniform pressure develops between reinforcing sheet members or foils and an X-ray film located therebetween. For this purpose, the cassette need not take up a great surface force and thereby in the closed position it retains its original shape. On the same grounds the cassette can be constituted by a synthetic plastic material so that it is cheaper to manufacture. Finally, as a result of low rigidity requirements made of the cassette, the sides of the cassette which face toward the X-ray tube can be so dimensioned that a small X-ray absorption is attained. Contrary to the known cassettes wherein the absorption is equal to substantially between 30% and 40%, the absorption of the cassette in accordance with the present invention can be equal to between 20% and 25% and lower. Preferably, the magnetic plate and the counterplate has a size corresponding to the size of the X-ray film.

In accordance with further features of the present invention, the magnetic plate and the counterplate may be formed as foils. The foil forming the counterplate may be attached to the body part of the cassette or be integral therewith. The magnetic plate may be connected to a respective one of the parts of the cassette by a border strip of a foam material.

Still further features of the present invention are that the magnetic plate and the counterplate may be located beteen the body part and the cover part of the cassette. On the other hand, the body part and the cover part of the cassette may be flexible. The magnetic plate and the counterplate may be arranged in a sandwich-like manner and located outwardly of the above-mentioned parts of the cassette.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
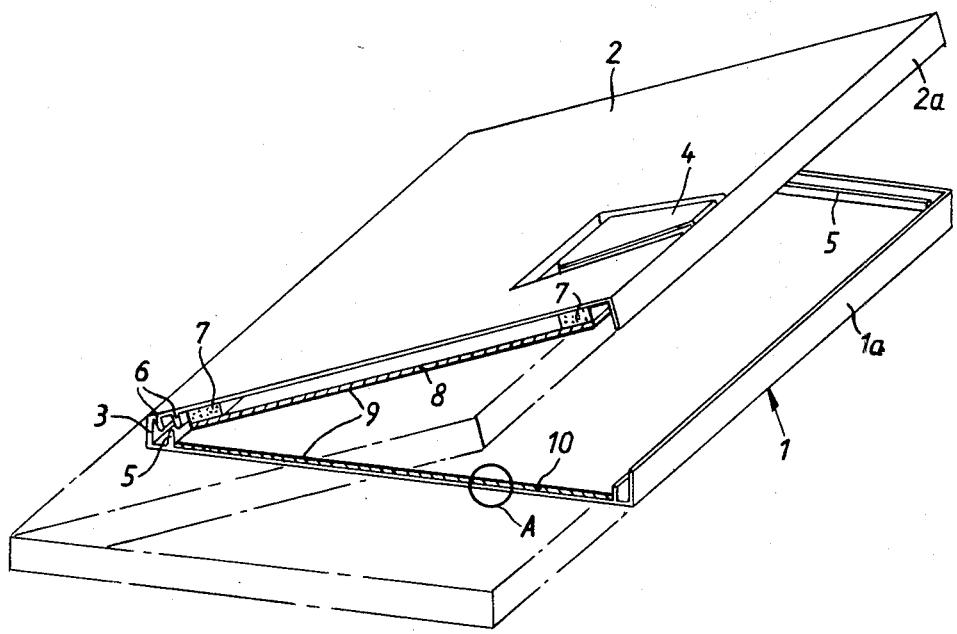
FIG. 1 is a partially sectioned perspective view of a cassette for accommodating an X-ray film in accordance with the present invention.
Figure 2:
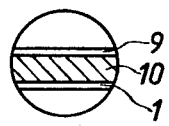
FIG. 2 is a fragmentary enlarged detail view, showing the area designated "A" in FIG. 1.

DESCRIPTION OF THE PREFERRED EMBODIMENTS:

As shown in FIGS. 1 and 2, a cassette for accommodating an X-ray film has a body part which is identified by reference numeral 1 and a cover part which is identified by reference numeral 2. The body part 1 and the cover part 2 are connected with one another by a flexible hinge 3. They are movable relative to one another between an open position in which they are spaced from one another, and a close position in which they are located adjacent to one another. An embedded handle 4 is formed in the cover part 2 and actuates locking elements for locking the body part 1 and the cover part 2 with one another in the closed position. The locking elements are known per se in the art, and for this reason are not shown in the drawing.

It is understood that in accordance with another embodiment of the present invention the flexible hinge 3 may be omitted; or in other words the cover part 2 is not connected with the body part 1. In such a construction, the cover part 2 may be case-shaped so as to be fitted onto the body part. In this case, the locking elements which retain the two parts together, are arranged at two sides of these parts. There are many other possibilities of connecting the body part 1 and the cover part 2 with one another.

Lips 5 are provided on the body part 1. The lips 5 extend inwardly in the region of outer edges and form a rectangle having a size which corresponds to the size of the reinforcing foils. Two parallel lips 6 are provided on the cover part 2 in the region adjacent to the flexible hinge 3. In the closed position of the cassette, the lips 6 of the cover part 2 extend at both sides of the lips 5 of the body part 1.

The body part 1 has a side flange 1a, whereas the cover part is provided with a side flange 2a. In the closed position of the cassette, a side flange 2a of the cover part 2 engages in a groove which is formed between the lips 5 of the body part 1 and the side flange 1a of the latter. Thereby a protection against penetration of light into the interior of the cassette is guaranteed.

A border strip 7 of a foam material is arranged on the inner surface of the cover part 2 of the cassette. The border strip 7 carries a magnetic plate 8. The latter has a size which substantially corresponds to that of reinforcing foils 9 of an X-ray film which is not shown in the drawing, and of a counterplate 10. The magnetic plate 8 and the counterplate 10 must have a size which is at least equal to that of the X-ray film and the reinforcing foils 9. The counterplate 10 may be formed as a foil. It is constituted by a material which has a high susceptibility to a magnetic moment with a small X-ray absorption. The counterplate foil 10 may be constituted by a steel foil having a thickness equal to between 0.01 and 0.05 mm, preferably 0.02 mm. It also may be constituted by an iron-containing carton, by a synthetic plastic material containing a ferromagnetic powder or foil, and the like. The magnetic susceptibility of the counterplate 10 may be greater than one.

The magnetic plate 8 is rigid or flexible. It may be constituted, for example, by a alnico-alloy, by an oxide permanent magnet (Fe-Co-Oxide, Ba-, Sr-Ferrite), by a magnetically coated polyvinylchloride foil, or by a magnet which is manufactured by an injection-molding process from an oxide-powder (ceramic material such as iron oxide or barium oxide) and a binder.

The reinforcing foils 9 are lightly connected to the magnetic plate 8 and the counterplate 10, respectively, for easy manipulation of the cassette, so that in the open position an X-ray film can be inserted into the interior of the cassette. After closing of the cassette, the X-ray film is located between the reinforcing foils 9 which are urged toward one another due to the sandwich-like arrangement of the magnetic plate 8 and the counterplate 10. Since there is a magentic field between the magnetic plate 8 and the counterplate 10, a uniform pressure is applied to the entire surface of the film in the closed position of the cassette. The uniformity of this pressure is a main criterion for high quality of the X-ray picture. When the cassette is being opened, the magnetic plate 8 which attracts the counterplate 10 is lifted together with the cover part 2 and its reinforcing foil 9.

Figure 3:
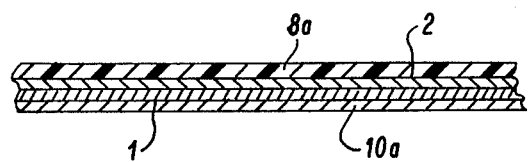
FIG. 3 is a fragmentary sectional view, illustrating another embodiment of the invention in closed position.

Instead of mounting the magnetic plate 8 on the elastic border strip 7, the magnetic plate may be integral with the cover part 2 or fixed to the elastic border strip by a thin jacket. As mentioned above, the magnetic plate may be flexible whereby optimization of the applied pressure is attained. In other cases, instead of forming a cassette with rigid walls, a flexible envelope may be utilized as fragmentarily shown in FIG. 3, in which the X-ray film and the reinforcing foils (not shown) arranged in sandwich-like manner are inserted so as to prevent penetration of light. For the purpose of improvement of the applied pressure, such an envelope can be utilized between the reinforcing foils and the film in the arrangement of the magnetic plate 8a and the counterplate 10a. The magnetic plate 8a and the counterplate 10a may be located outwardly of the body part 1 and the cover part 2, as shown.

It will be understood that each of the elements described above, or two or more together, may also find a useful application in other types of constructions differing from the types described above.

While the invention has been illustrated and described as embodied in a cassette for accommodating an X-ray film, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cassette for accommodating an X-ray film surrounded by reinforcing foils, comprising a body part; a cover part movable relative to said body part between an open position in which said parts are spaced from one another and a closed position in which said parts are located adjacent to one another; means for connecting said parts with one another in said closed position; magnetic means including a magnetic plate associated with one of said parts, and a counterplate associated with the other part and constituted by a material which has high susceptibility to a magnetic moment, so that in said closed position said counterplate is attracted to said magnetic plate and thereby the reinforcing foils are urged against the X-ray film; and a border strip of a foam material located between said magnetic plate and said one part and connecting the former with the latter.

2. A cassette as defined in claim 1, wherein said one part is a cover part which is movable relative to said body part between said open and closed positions, said magnetic plate being connected through said border strip to said movable cover part.

3. A cassette as defined in claim 1, wherein said magnetic plate and said counterplate are located inwardly of said body part and cover part as considered in said closed position.

4. A cassette for accommodating an X-ray film surrounded by reinforcing foils, comprising a flexible body part; a flexible cover part movable relative to said body part between an open position in which said parts are spaced from one another and a closed position in which said parts are located adjacent to one another; means for connecting said parts with one another in said position; and magnetic means, including a magnetic plate and a counterplate constituted of a material which has high susceptibility to a magnetic moment, said magnetic plate and said counterplate sandwiching said body part and cover part between them so that when in said closed position said counterplate is attracted to said magnetic plate, the reinforcing foils are urged against the X-ray film.

5. A cassette as defined in claim 4, wherein the magnetic susceptibility of said counterplate is greater than one.

6. A cassette as defined in claim 4, wherein said magnetic plate is constituted by a material which is selected from the group consisting of an alnico-alloy, an oxide permanent magnet, a magnetically coated polyvinylchloride, and a magnet manufactured by an injection-molding process from an oxide powder and a binder.

7. A cassette as defined in claim 4, wherein the X-ray film has a predetermined size, said magnetic plate and counterplate having a size substantially corresponding to the size of the X-ray film.

8. A cassette as defined in claim 7, wherein the size of said magnetic plate and counterplate is at least equal to the size of the X-ray film.

9. A cassette as defined in claim 4, wherein said counterplate is formed by a foil.

10. A cassette as defined in claim 9, wherein said foil forming said counterplate is attached to said body part.

11. A cassette as defined in claim 9, wherein said foil forming said counterplate is integral with said body part.

12. A cassette as defined in claim 9, wherein said foil forming said counterplate has a thickness which is equal to between 0.01 and 0.05 mm.

13. A cassette as defined in claim 12, wherein said counterplate is constituted by a material selected from the group consisting of a steel foil, an iron-containing carton, a synthetic plastic material containing ferromagnetic particles, and a synthetic plastic material with a magnetic foil embedded therein.

* * * * *